Sept. 22, 1953  H. T. LANGABEER  2,653,253
POWER SUPPLY SYSTEM

Filed Feb. 14, 1952  6 Sheets-Sheet 2

FIG. 2

INVENTOR
H. T. LANGABEER
BY
*G. F. Heuerman*
ATTORNEY

FIG. 4

Sept. 22, 1953     H. T. LANGABEER     2,653,253
POWER SUPPLY SYSTEM Filed Feb. 14, 1952     6 Sheets-Sheet 5

INVENTOR
H. T. LANGABEER
BY
ATTORNEY

Sept. 22, 1953 H. T. LANGABEER 2,653,253
POWER SUPPLY SYSTEM
Filed Feb. 14, 1952 6 Sheets-Sheet 6

FIG. 6

INVENTOR
H. T. LANGABEER
BY
G. F. Heuerman
ATTORNEY.

Patented Sept. 22, 1953

2,653,253

UNITED STATES PATENT OFFICE 2,653,253

POWER SUPPLY SYSTEM

Harvey T. Langabeer, Rockville Centre, N. Y., assignor to Bell Telephone Laboratories, Incorporated, New York, N. Y., a corporation of New York Application February 14, 1952, Serial No. 271,470

10 Claims. (Cl. 307—65)

1

This invention relates to a power supply system and particularly to a system for supplying direct current from one or more of a plurality of current sources, as required, to a load circuit comprising a battery and a variable load connected across the battery.

An object of the invention is to provide an improved power supply system comprising a plurality of current supply units in which the number of units supplying current to a load is increased or decreased automatically in accordance with the requirements of the load.

In a specific embodiment of the invention, herein shown and described for the purpose of illustration, a plurality of motor-generator sets or charging units are provided for supplying direct current to a load circuit comprising a battery and a variable load connected across the battery. The first and second of the charging units are preferably each provided with regulating apparatus of the type disclosed in an application of J. R. Stone, Serial No. 188,190, filed October 3, 1950, now Patent No. 2,604,619, granted July 22, 1952, for maintaining the load voltage substantially constant for currents up to a certain maximum value supplied from the charging unit to the load circuit. One of the charging units may have a different full load ampere rating than that of another unit. For example, the first unit may have a smaller capacity than the second unit. Each of the charging units subsequent to the second unit is preferably provided with a motor-driven rheostat for controlling the current supplied to the generator field and, therefore, the current supplied by the generator to the load circuit, the generator supplying substantially constant current when the motor for driving the rheostat is not energized. Circuits employing electromagnetic relays are provided for starting and stopping the charging units, for connecting and disconnecting the units to the load circuit and for controlling the currents supplied by the units to the load circuit.

When the load increases to a value where the first charging unit will not satisfy the load requirements, the second unit will be started and supply current to the load circuit and then the first unit will be disconnected from the load circuit and stopped. Likewise when the load decreases to a current value which can satisfactorily be supplied by the first unit alone, the first unit is restarted and supplies current to the load and the second unit is disconnected from the load and stopped.

When the current supplied from the second

2 unit to the load circuit increases to its full load ampere rating, the third charging unit will start and be connected to the load circuit. The output of the third unit will increase until the current supplied from the second unit decreases to a value less than 75 per cent of its full load ampere rating. When only the second and third units are supplying current to the load circuit, each time the output of the second unit increases to 75 per cent of its rated output, the output of the third unit will be gradually increased and, if the output of the second unit decreases to 25 per cent of its rated output, the output of the third unit will be gradually decreased.

When the output current supplied to the load circuit by the last operating unit, the third unit, for example, increases to its full load ampere rating, a succeeding unit, like the third unit, will be started and caused to supply current to the load. The output of this last connected unit will be increased when the output of the second unit increases to 75 per cent of its full ampere rating and will be decreased when the output of the second unit decreases to 25 per cent of its rated output. When the current supplied to the load circuit by the last operating charging unit decreases to zero and reverse current flows from the battery to the charging unit, this unit will be deenergized and disconnected from the load circuit. If all of the units except the first are operating to supply current to the load and the current supplied by the last unit increases to full output, the first unit will restart and supply substantially constant, full rated output current to the load to supplement the current supplied by the other units.

If the load is decreasing, when the output of the second unit reaches 25 per cent of its full output, the first unit will be stopped and disconnected from the load. If the output of the last unit should reach zero and reverse current should flow from the battery to the last unit, the last unit will be disconnected and stopped. Similarly, the other units will be disconnected from the load and stopped when they are no longer required.

Figs. 1 to 6, inclusive, when arranged in the order indicated by the diagram of Fig. 7, are a diagrammatic view of a power supply system embodying the invention.

Figures 1, 7:
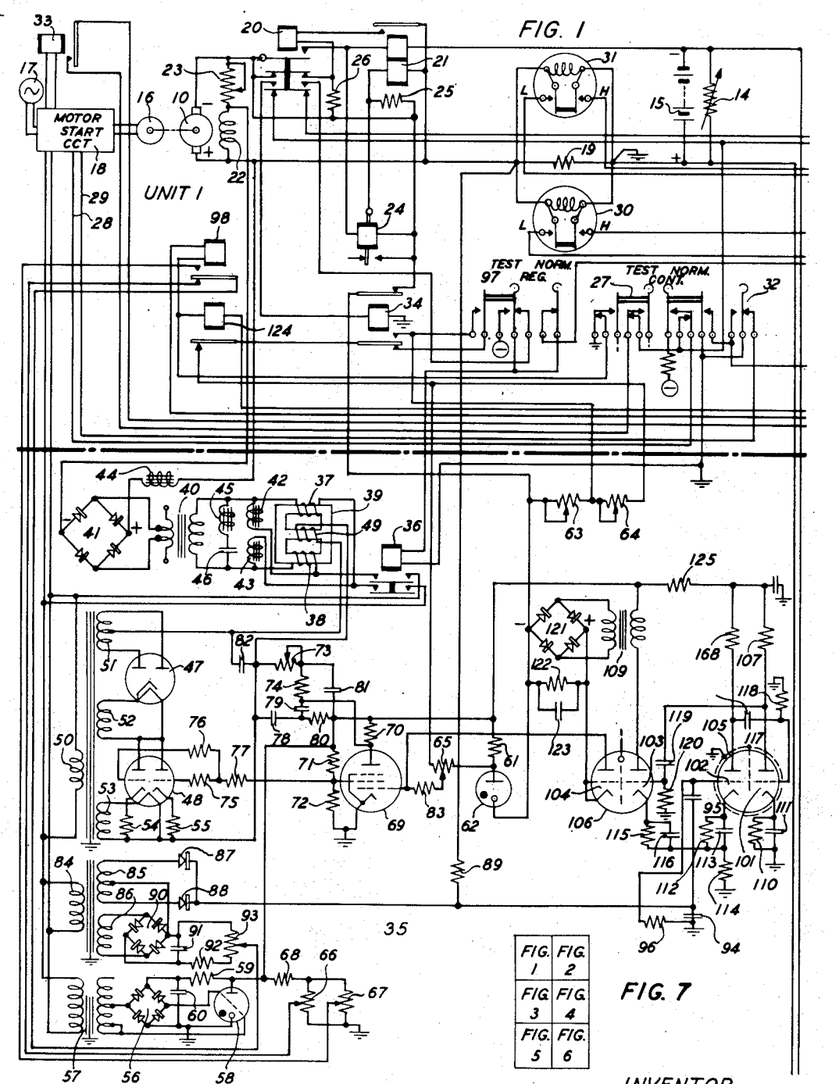

There are provided a plurality of current supply units designated 1, 2, 3 and 4, including direct-current generators 10, 11, 12 and 13, respectively, for supplying current to a variable load 14 across which is connected a floating battery 15. Considering the supply unit 1, the generator 10, driven by a motor 16 when energized by current from an alternating-current supply source 17 through a motor starting circiut 18, has its positive terminal connected through a resistor 19 of small ohmic value to the positive load terminal which is grounded. The negative generator lead is connected through the main contacts of a contactor 20 when energized and through the upper or series winding of a relay 21, which also has a lower or shunt winding, to the negative load terminal. There are connected across the generator 10 a field winding 22 and a rheostat 23 in series. The winding of a polarized relay 24 is connected across the main contacts of contactor 20. The polarity of the relay 24 is such that, when the generator 10 is idle, current from the battery 15 flows through the winding of the relay and the generator armature in a direction to prevent operation of the relay. When the generator voltage builds up to about one volt above the battery voltage, current of sufficient amplitude flows through the relay winding in a direction to cause it to operate. The shunt winding of relay 21 is connected in series with a resistor 25 across the terminals of generator 10. The operation of relay 24 completes a short-circuiting path across resistor 25 to cause relay 21 to operate. The operation of relay 21 completes a circuit from the negative terminal of generator 10, through auxiliary contacts of contactor 20, the winding of contactor 20 and through the contacts of relay 21 to the positive generator terminal. The resulting operation of contactor 20 completes the circuit from generator 10 to the load and opens a short-circuiting path across a resistor 26, thereby connecting this resistor in series with the winding of contactor 20. A short-circuiting path across relay 24 is also completed by the operation of contactor 20, causing relay 24 to release to remove the short-circuiting path across the resistor 25, thereby causing the current in the shunt winding of relay 21 to decrease. When the generator voltage decreases sufficiently, due to disconnecting the motor 16 from the source 17 or due to a decrease of the current in field winding 22, the current in the series winding of relay 21 is reversed, thereby causing the magnetomotive force in the relay core due to the series winding to oppose the magnetomotive force due to the shunt winding and causing the relay 21 to release. The release of relay 21 opens the energizing circuit for contactor 20 to cause it to release, thereby disconnecting the generator 10 from the load circuit.

Two ammeter relays 30 and 31 are provided, each having a high contact H, a low contact L and a winding connected across the resistor 19. The high contact of relay 30 is adjusted to close when generator 10 reaches its full load ampere output and its low contact is adjusted to close when the generator output voltage decreases sufficiently to cause a reverse current of a predetermined small amplitude to flow from battery 15 through the circuit comprising resistor 19 and the armature of generator 10. The low contact L of ammeter relay 31 is adjusted to open when the output current of generator 10 increases to approximately 25 per cent of its full load ampere rating. The high contact of relay 31 is adjusted to close when the generator output current is increased to about 75 per cent its full load ampere rating.

There is provided a voltage regulator 35, shown below the dash-dot line in Fig. 1, for automatically controlling the current supplied to the generator field winding 22 to control the generator output voltage. This voltage regulator is similar to that disclosed in the patent of J. R. Stone to which reference is made above. When the relay 36 is energized, alternating current from source 17 is supplied through the motor starting circuit 18 and through the windings 37 and 38 of a saturable reactor 39 to the primary of a transformer 40 the secondary of which is connected to the input terminals of a varistor bridge rectifier 41. There is provided a reactor having a winding 42 connected across reactor winding 38 and the primary of transformer 40 in series and having a winding 43 connected across reactor winding 37 and the primary of transformer 40 in series. The rectifier 41 supplies current through an inductance coil 44 to the field winding 22 of generator 10. An inductance coil 45 and a condenser 46 in series are connected in a shunt path across the primary winding of transformer 40 to reduce the amplitude of harmonics introduced by the saturable reactor 39 and thereby reduce the peak inverse voltage across the elements of rectifier 41.

A rectifier comprising a space current tube 47 is provided for rectifying current from the supply source 17 and for supplying the rectified current through the space current paths of a twin triode space current device 48 to the saturating winding 49 of saturable reactor 39. This saturating current is controlled to vary the impedance of reactor windings 37 and 38 which control the alternating current supplied to rectifier 41, thereby controlling the rectified current supplied from rectifier 41 to the generator field winding 22. The rectifier comprises a transformer having a primary winding 50 supplied with current from the supply source 17 and secondary windings 51, 52 and 53. Windings 52 and 53 supply current to the cathode heaters of tubes 47 and 48, respectively. The end terminals of winding 51 are connected to the anodes of tube 47 and a mid-terminal of this winding is connected to one terminal of the saturating winding 49 of saturable reactor 39. The other terminal of the saturating winding is connected through resistors 54 and 55, respectively, to the cathodes of the tube 48.

There is provided a varistor bridge rectifier 56 to which current is supplied from source 17 through a transformer 57. A cold cathode, gas-filled voltage regulating tube 58 in series with a resistor 59 are connected across the output terminals of rectifier 56, as is also a condenser 60. A shunt path across the voltage regulating tube 58 comprises in series a resistor 61 and a second cold cathode voltage regulating tube 62 to the negative load terminal and from the positive grounded terminal of the load to the grounded terminal of rectifier 56 and of tube 58. A voltage divider across constant voltage tube 62 comprises in series rheostats 63 and 64 and a potentiometer 65. Potentiometers 66 and 67 in parallel are connected in series with a resistor 68 across the constant voltage tube 58.

A direct-current amplifier comprising a space current tube 69 is provided for controlling the grid-cathode voltage of tube 48 to control its anode-cathode resistance in response to a control voltage impressed upon the control grid-cathode circuit of tube 69. Space current is supplied to tube 69 from rectifier 56 by connecting the space current path of the tube in series with an anode resistor 70 across the constant voltage tube 58. A voltage divider comprising resistors 71 and 72 in series is connected across the constant voltage tube 58. The cathodes of tube 48 are connected through resistors 54 and 55, respectively, and through a rheostat 73 and a resistor 74 to the anode of tube 69 and the control grids of tube 48 are connected through resistors 75 and 76, respectively, and through a resistor 77 to the common terminal of resistors 71 and 72, the screen grid of tube 69 also being connected to this common terminal. Condensers 78 and 79 in series are in a path connected across rheostat 73 and resistor 74, the common terminal of these condensers being connected through a resistor 80 to the common terminal of resistors 70 and 71. A condenser 81 is provided in a path connecting a common terminal of rheostat 73 and resistor 74 and a common terminal of resistors 80 and 71. A filtering condenser 82 is connected across the saturating winding 49 of saturable reactor 39. The portion of the circuit comprising rheostat 73, resistors 74 and 80, and condensers 78, 79 and 81 is provided to reduce any tendency of the generator-regulator combination to hunt, that is, any tendency of the generator voltage to rise and fall periodically. The effectiveness of this anti-hunt circuit may be controlled by adjusting the rheostat 73. The amplified output voltage of amplifier tube 69 across the anode resistor 70 and, in series therewith, an opposing substantially steady direct voltage across resistor 71 are thus impressed upon the grid-cathode circuits of the triodes of tube 48 to control the anode-cathode resistance of the tube and to thereby control the current supplied to saturating winding 49.

A circuit may be traced from the control grid of tube 69 through a resistor 83 to the variable tap of potentiometer 65, through a portion of the potentiometer resistance, through rheostats 64 and 63 and through the load 14 to the grounded cathode of tube 69. In this circuit the substantially constant voltage across rheostats 63 and 64 and potentiometer 65 is in opposition to the load voltage. Considering the regulating circuit only as thus far described, there is impressed upon the control grid-cathode circuit of tube 69 a unidirectional voltage which makes the grid suitably negative with respect to the cathode and having the variations which may be present in the load voltage. An increase of load voltage, for example, has the effect of making the control grids of tubes 69 and 48 relatively more negative with respect to the respective cathodes, thereby increasing the resistance of the space current paths of tube 48 and decreasing the current supplied to saturating winding 49 of saturable reactor 39. The impedance of windings 37 and 38 of the saturable reactor is thus increased to effect a reduction of the current supplied from rectifier 41 to the field winding 22 of generator 10. As a result, the generator output voltage decreases to cause the initially assumed rise of load voltage to be minimized.

When the current supplied from generator 10 to the load exceeds a certain maximum value, its full rated output current for example, means are provided for reducing the output voltage of generator 10 in response to an increase of current from generator 10 to minimize the current increase. There is provided a transformer 84 having a primary supplied with current from source 17 and two secondary windings 85 and 86. The end terminals of winding 85 are connected through asymmetrically conducting varistors or rectifying elements 87 and 88 and through resistors 89 and 19 to ground. A pulsating unidirectional voltage appears across the output of rectifiers 87, 88, that is, between the common terminal of rectifying elements 87 and 88 and a mid-terminal of transformer winding 85, a pulse being produced during each half-cycle period of source 17. The amplitude of these pulses varies with voltage changes of source 17. The transformer winding 86 is connected to the input terminals of a varistor bridge rectifier 90. The output current of this rectifier is supplied through a ripple filter comprising a shunt condenser 91 and a series resistor 92 to a potentiometer 93. The filter suppresses alternating components having a frequency equal to the frequency of source 17 and harmonics thereof.

There is impressed across the current path comprising resistors 89 and 19 in opposition to the voltage across resistor 19, when the generator is supplying current to the load, a voltage equal to the pulsating output voltage of rectifier 87, 88 plus the voltage across a portion of potentiometer 66 or 67 minus the voltage across a portion of potentiometer 93. The potentiometer 93 is adjusted so that the pulsating voltage from rectifier 87, 88 is equal to the voltage across the effective portion of potentiometer 93. The magnitude of the pulses impressed across resistors 89 and 19 will thus be equal to the voltage across the effective portion of potentiometer 66 or 67 between its variable tap and ground, these pulses being of substantially constant amplitude since the changes of output voltage of rectifier 87, 88 due to line voltage changes are compensated for by the equal and opposing voltage changes across the effective portion of potentiometer 93. The magnitude of the pulses is adjusted by means of potentiometer 66 or 67 to a desired amplitude which under all operating conditions is preferably somewhat larger than the voltage across resistor 19. A condenser 94 is connected across resistors 89 and 19 in series and there are connected across condenser 94 a condenser 95 and a resistor 96 in series. There will be set up across condenser 94 a pulsating voltage which decreases as the voltage across resistor 19 increases due to an increase of current flow from generator 10, and vice versa. When the voltage across condenser 94 is increasing, current flows through condenser 95 and resistor 96 in one direction to charge condenser 95 and when the voltage across condenser 94 is falling, condenser 95 discharges to cause current to flow in the opposite direction through resistor 96. There is thus set up across resistor 96 an alternating voltage the amplitude of which decreases as the load current increases.

The alternating voltage across resistor 96 is amplified by the alternating-current amplifier comprising space current triodes 101, 102 and 103, triodes 101 and 102 being the triodes of a twin triode tube 105 and triodes 103 and 104 being the triodes of a twin triode tube 106. Space current is supplied to triodes 101, 102 and 103 from rectifier 56. For this purpose the anodes of triodes 101 and 102 are connected through a resistor 125 and resistors 107 and 108, respectively, and the anode of triode 103 through the primary of a transformer 109 to the positive terminal of constant voltage tube 58 and the cathode of the triode 101 is connected to ground through a resistor 110 shunted by a condenser 111, the cathode of triode 102 is connected to ground through a resistor 112 shunted by a condenser 113 and through a resistor 114, and the cathode of triode 103 is connected to ground through a resistor 115 shunted by a condenser 116 and through the resistor 114. The anode-cathode circuit of triode 102 is coupled through a condenser 117 and a resistor 118 to the grid-cathode circuit of triode 101 the anode-cathode circuit of which is coupled through a condenser 119 and a resistor 120 to the grid-cathode circuit of triode 103. The alternating voltage across the secondary of transformer 109 is rectified by a varistor bridge rectifier 121 to set up across the rectifier output terminals to which a resistor 122 and a condenser 123 are connected in parallel, a direct voltage which decreases as the current from generator 10 flowing through resistor 19 increases. The control electrode and cathode of the triode 104 are conductively connected so that it functions as a diode the anode of which is connected to the control grid of tube 69 and the cathode of which is connected to the positive output terminal of rectifier 121.

It will now be seen that the circuit connecting the control electrode and cathode of tube 69 comprises the load 14 and in series therewith two parallel branch paths. One of the branch paths comprises resistor 83 and the substantially constant voltage across an adjustable portion of potentiometer 65 and rheostats 64 and 63 all in series. The second branch path comprises in series the diode 104 and the rectifier 121. When the voltage across rectifier 121 in the second branch is larger than the voltage in the first branch path, the cathode of diode 104 is at a positive potential with respect to its anode so that the diode is in a non-conducting state. For this condition, the voltage of rectifier 121 has no effect upon the grid-cathode circuit of tube 69. However, as the current from generator 10 increases to cause the output voltage of rectifier 121 to decrease, a condition will be reached where the voltage across the path 63, 64, 65, 83 is slightly greater than the output voltage of rectifier 121. Current will then flow through resistor 83 and diode 104 in a direction to make the grid of tube 69 relatively more negative with respect to its cathode. This current flow will increase as the output voltage of rectifier 121 further decreases due to a further increase of current from generator 10 to make the control grid of tube 69 still more negative with respect to its cathode.

It is seen, therefore, that when the current supplied from generator 10 to the load circuit is less than a certain maximum value, diode 104 is non-conducting and there is impressed upon the control grid-cathode circuit of tube 69 two opposing voltages which are the load voltage and the constant voltage across the rheostats 63 and 64 and a portion of potentiometer 65. Then if the load voltage increases, the control grids of tubes 69 and 68 are made relatively more negative with respect to their cathodes to reduce the current in saturating winding 49 and thus reduce the output voltage of generator 10 to minimize the initially assumed rise of load voltage. However, when the current supplied from generator 10 to the load circuit rises above said maximum value, diode 104 becomes conducting to produce a voltage drop across resistor 83 which is the same polarity as the voltage across the load and of opposite polarity with respect to the constant voltage across rheostats 63 and 64 and a portion of potentiometer 65, all in the control grid-cathode circuit of tube 69. The effect of the voltage drop across resistor 83 is to make the control grids of tubes 69 and 48 relatively more negative with respect to the cathodes so as to reduce the output voltage of generator 10 as the generator output current is increased above the maximum value.

Figure 3:
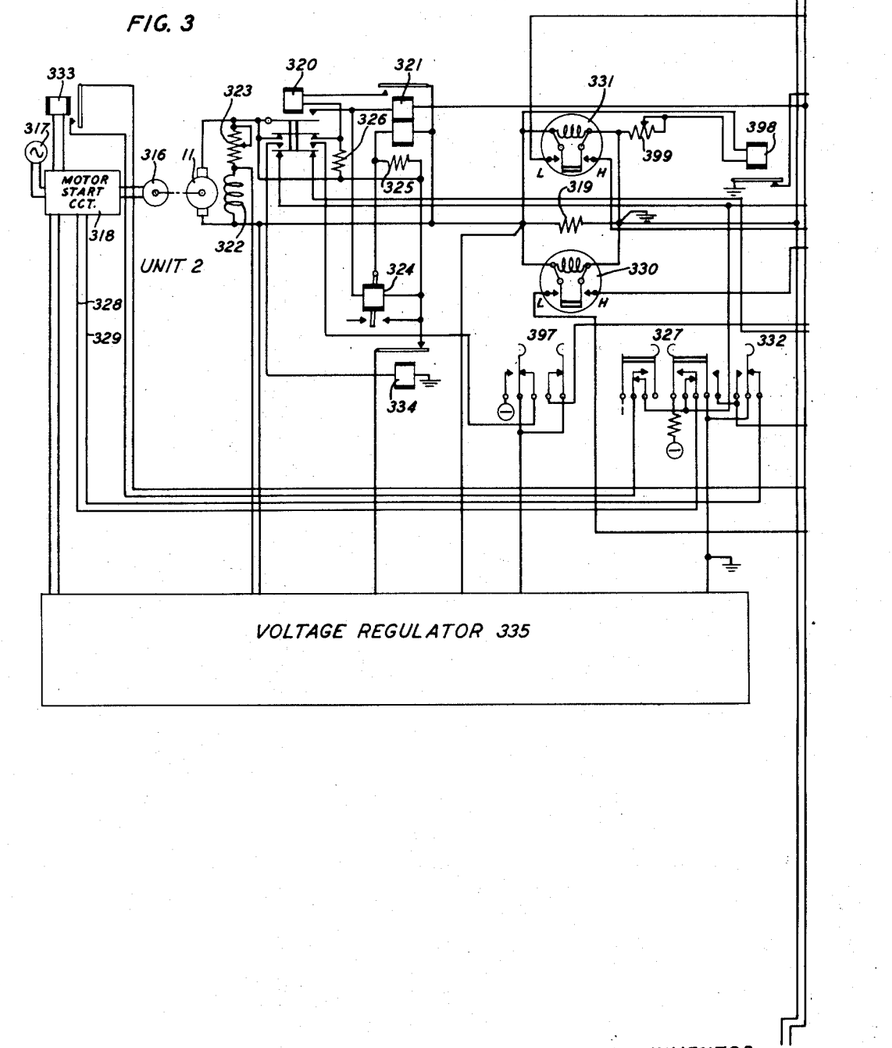
Figure 4:
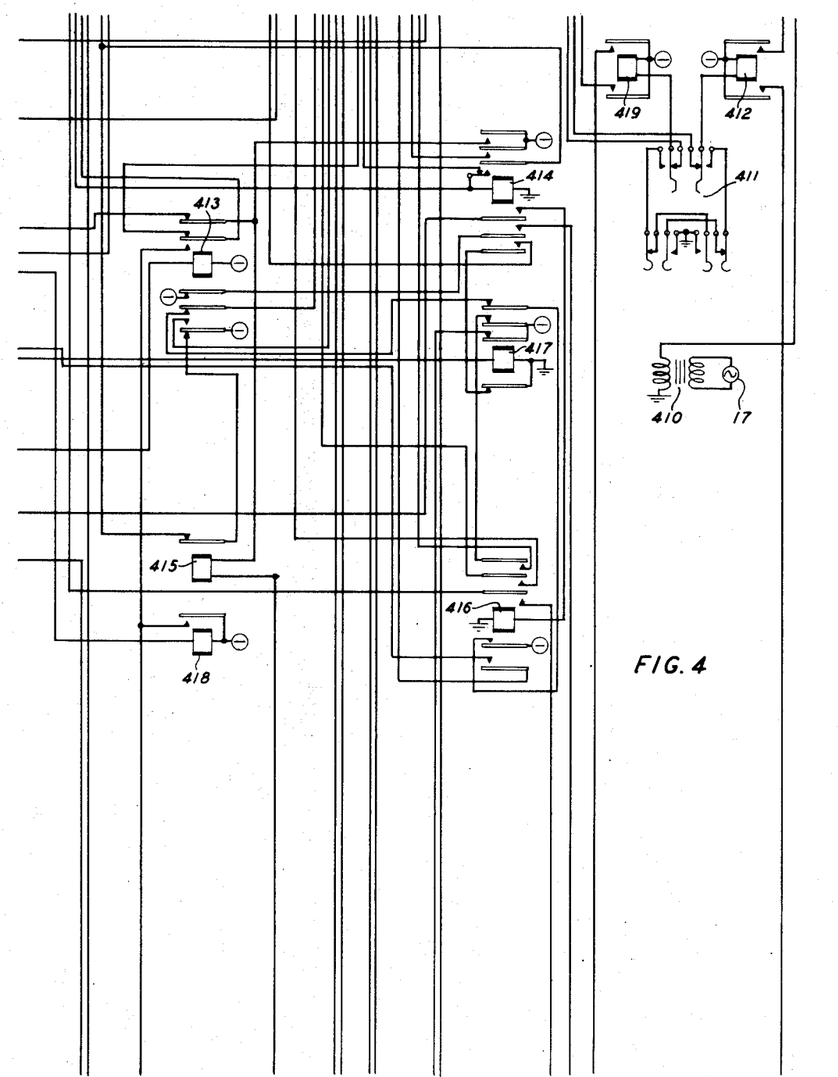

A second current supply unit comprising generator 11 for supplying current to load 14 and battery 15 is shown in Fig. 3. This second unit is similar to unit 1 of Fig. 1 but may be of larger load ampere capacity. The components of unit 2, except the generator, are designated by numerals the first digit of which is 3 and the following two digits of which are the same as the numerals used to designate corresponding parts of unit 1. The voltage regulator 335 for unit 2 shown by a box in Fig. 3 is like the voltage regulator 35 of Fig. 1.

Figure 2:
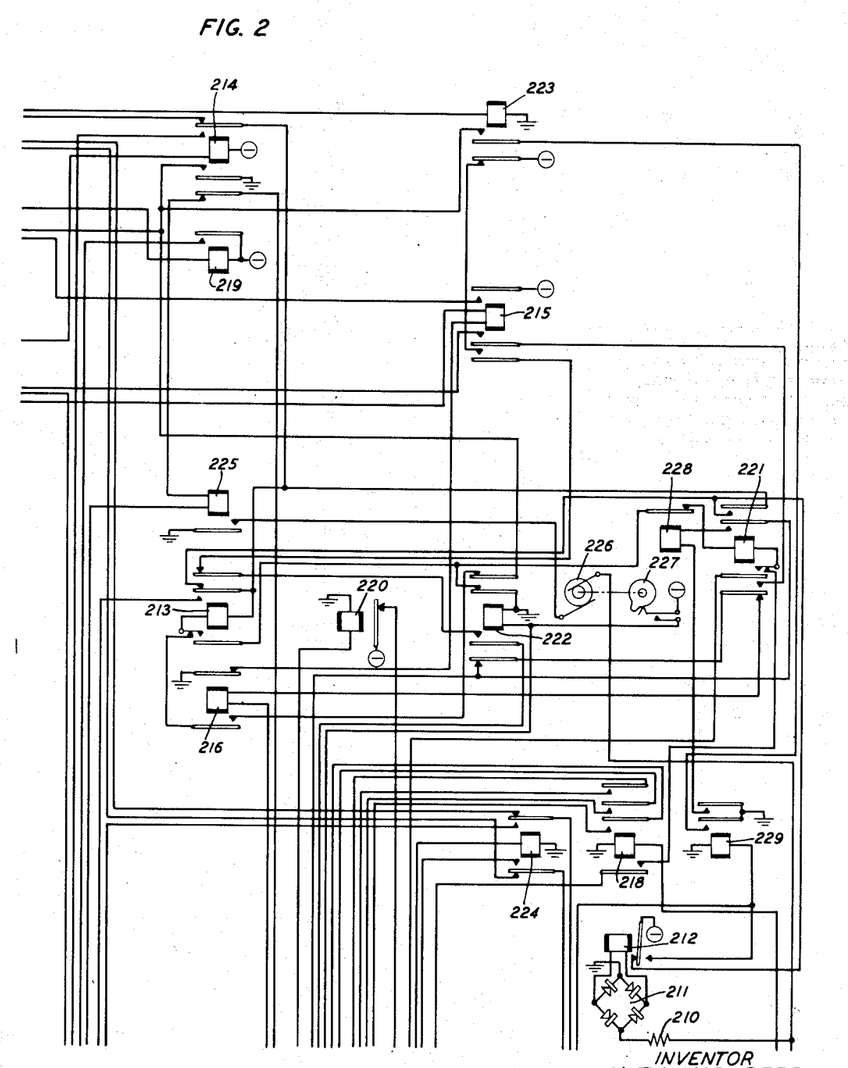
Figure 5:
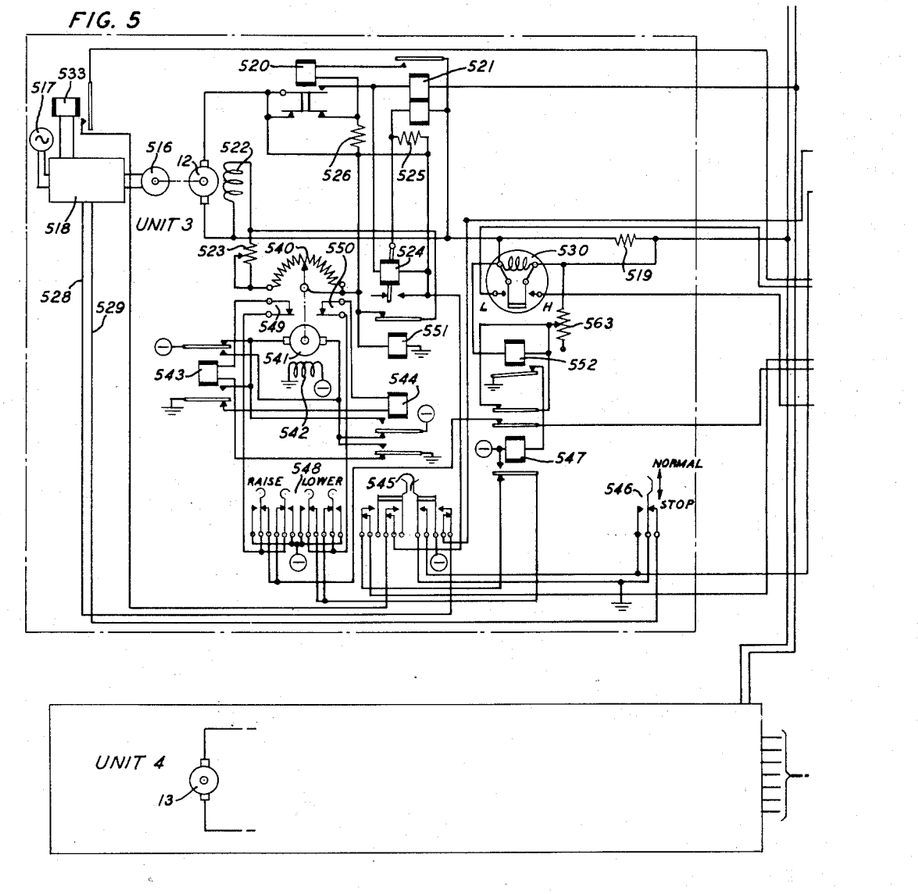
Figure 6:
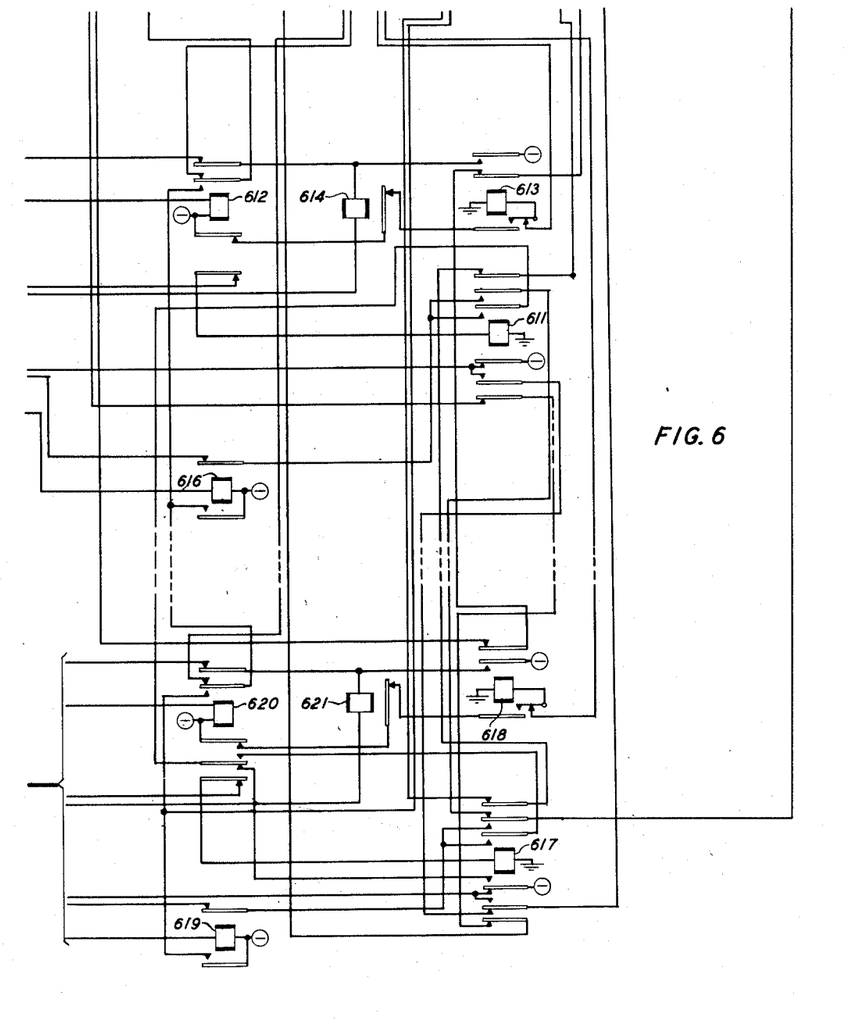

A third and fourth current supply unit comprising generators 12 and 13, respectively, for supplying current to load 14 and battery 15 are shown in Fig. 5. Unit 4 is like unit 3 and is shown by a box in Fig. 5. The parts of unit 3, except the generator, which are like those of units 1 and 2 are designated by numerals the first digit of which is 5 and the following two digits of which are the same as the numerals used in Figs. 1 and 2 to designate the corresponding parts.

There is provided in series with the field winding 522 of generator 12 and rheostat 523, a motor driven rheostat 540 driven by a motor 541 having a field winding 542 connected across the negative and grounded terminals of battery 14, as indicated. Rheostats 523 and 540 are short-circuited through a contact of relay 551 when released. This relay is operated by current from generator 12, when the generator voltage reaches a sufficient value to cause relay 551 to operate, thereby removing the short circuit. There are provided relays 543 and 544 for controlling the energization of the armature of motor 541 to cause it to drive the rheostat 540 in one direction or the other to control the current in the field winding 522 and the generator output voltage which is increased in response to the energization of relay 543 and decreased in response to the energization of relay 544. The energizing circuits for relays 543 and 544 are completed through contacts, respectively, of relay 547 when released. The winding of relay 552 is connected through a variable resistor 563 across resistor 519. If the generator output should increase to 115 per cent of full current rating, for example, relay 552 would operate to cause the energization of relay 547, thereby opening the circuits for normally controlling the energization of relays 543 and 544 and connecting battery to relay 544 to cause the output voltage of generator 12 to decrease. When both relays 543 and 544 are unactuated, as shown both terminals of the armature of motor 541 are connected to negative battery. This short-circuiting of the motor armature causes a dynamic braking action on the motor armature and prevents overshooting of motor 541 and consequent hunting of the control system for controlling the output of generator 12.

When current from the alternating-current supply source 17 is supplied to the power supply system, current is supplied through a transformer 410 and a resistor 210 to a varistor bridge rectifier 211 to cause the energization of a relay 212 connected to the output terminals of rectifier 211. The operation of relay 212 causes the completion of a circuit from negative battery, through a contact of a relay 213, through a contact of a relay 214, through a key 27 and through a lead 28 to the motor start circuit 18, through lead 29 and through key 32 to ground, thereby connecting the motor 16 to the source 17 to cause it to drive the generator 10. When the motor starter 18 operates, a relay 33 will be energized to complete a circuit from negative battery, through contacts of relays 212, 213 and 214, through key 27 and through the winding of a relay 215 and through a contact of relay 216 to ground to cause the energization of relay 215. Due to the operation of relay 215 there is completed a circuit from negative battery through a contact of relay 215, through key 97 and winding of relay 36 to ground, thereby causing relay 36 to operate to complete a circuit for energizing rectifier 41.

When the output of generator 10 increases to substantially 75 per cent of its full load rating, ammeter relay 31 closes its high contact and a circuit is completed from ground through contacts of relays 224, key 411 and through the winding of a relay 412 to negative battery, thereby operating relay 412. As a result a circuit is completed for operating a relay 213. When the output of generator 10 increases further to its full load rating, ammeter relay 30 closes its high contact to complete a circuit for causing a relay 219 to operate. As a result, a circuit is completed from negative battery through contacts of relays 219, 413, 218 and 414 and through the winding of relay 414 to ground, causing relay 414 to operate. The relay 414 locks up due to a circuit completed from ground through the winding and contacts of relay 414, contacts of relays 415 and 413 to negative battery. The operation of relay 414 completes a circuit from negative battery through contacts of relays 414 and 413, key 327, lead 328 to the starting circuit 318 for motor 316, lead 329 and key 332 to ground. Motor 316 is thus started to cause it to drive generator 11. Contactor 320 becomes operated, as described with respect to the contactor 20 of Fig. 1, thus causing generator 11 to supply current to load 14 and battery 15 to supplement the current supplied thereto from generator 10. When the motor starter 318 operates, a relay 333 will be energized to complete a circuit from negative battery through contacts of relays 414 and 413, key 327 and through the winding of relay 416 to ground, operating relay 416. As a result a circuit is completed from negative battery through contacts of relays 220 and 416, key 397 to a relay in voltage regulator 335 corresponding to relay 36 of Fig. 1. Before contactor 320 operates, a circuit is completed from negative battery, through contacts of relays 414 and 413 and of contactor 320 and through the winding of relay 417 to ground to operate relay 417. The operation of contactor 320 therefore releases relay 417 to complete a circuit from negative battery through contacts of relays 417, 617, 611 and 416, through the winding of relay 98 and key 27 to ground, operating relay 98. The variable contact of potentiometer 93 is thus connected to the contact of potentiomeer 67 which is adjusted so that the generator 10 supplies about 75 per cent of its full output to the load circuit comprising load 14 and battery 15. The release of relay 417 completes a circuit from negative battery through the contacts of relays 417 and 416 and through the winding of relay 224 to ground, operating relay 224. The control of relay 412 is thus transferred from ammeter relay 31 of unit 1 to ammeter relay 331 of unit 2, a circuit being completed from the H contact of ammeter relay 331, through a contact of relay 224, key 411 and through the winding of relay 412 to negative battery.

A circuit traced from ground, through contacts of relay 417 and 414, winding of relay 216, contacts of relays 221, 222, 413, 417 and 416 to negative battery operates relay 216. As a result ground is removed from the winding of relay 215, causing it to release. The release of relay 215 removes battery from relays 36 and 34 causing them to release, thereby causing the output current of generator 10 to decrease to zero. The ammeter relay 30 thus closes its L contact to complete a circuit from ground, through contacts of relays 222 and 216, winding and contact of relay 213 and contact of relay 212 to negative battery. The relay 213 is thus operated and it locks up under control of relay 222. The operation of relay 213 disconnects battery from the motor starting circuit 18, causing motor 16 to stop and, as above described, causing the release of relay 20 to disconnect generator 10 from the load circuit 14, 15.

While unit 1 is being stopped and disconnected from the load circuit, generator 11 of unit 2 is supplying current to the load circuit. As previously stated, unit 2 has a larger load ampere capacity than that of unit 1. When the output of generator 11 reaches 75 per cent of its full load ampere capacity, ammeter relay 331 closes its high contact to complete a circuit from ground through a contact of relay 224, key 411 and winding of relay 412 to negative battery. The resulting operation of relay 412 completes a circuit from negative battery, through the winding of relay 218 to ground, operating relay 218.

If the load current supplied from generator 11 of unit 2 should increase to its full load ampere rating, relay 330 will operate to close its H contact, thereby completing a circuit from ground through the winding of relay 418 to negative battery, operating relay 418. As a result there is completed a circuit from negative battery, contacts of relays 418, 612, 218 and 613 and winding of relay 613 to ground, operating relay 613. This relay locks up through its contacts and contacts of relays 614 and 612. The operation of relay 613 completes a circuit from negative battery through contacts of relays 613 and 612, key 545, lead 528 to motor starting circuit 518, lead 529 and through key 546 to ground, thereby starting motor 516. When the motor starter 518 operates to the run position, relay 533 is energized to complete a circuit from negative battery, through key 545, contact of relay 612 and winding of relay 611 to ground, operating relay 611. Then, when relay 412 is operated, a circuit is completed from negative battery, contacts of relays 412, 617, 611, 616 and 547, key 548, contacts of limit switch 549, winding of relay 543 and contact of relay 544 to ground, thereby operating relay 543. When a relay 419 is operated, a circuit is completed from grounded battery, through contacts of relays 419, 617 and 611, key 545, contact of relay 547, key 548, limit switch 550, winding of relay 544 and contact of relay 543 to ground, thereby operating relay 544. Operation of relay 543 while relay 544 is released energizes the armature of motor 541 to cause it to rotate the movable arm of potentiometer 540 in a direction to reduce the resistance in series with the generator field winding 522, thereby causing the current output of generator 12 to increase. When relay 544 is energized while relay 543 is released the motor 541 is caused to run in the opposite direction so as to increase the resistance of the field winding circuit and to reduce the output current of generator 12. If the movable arm of potentiometer 540 should be driven to an extreme position in either direction, the limit switch 549 or the limit switch 550 will be opened to open the energizing circuits for relays 543 and 544, thus stopping the motor 541.

When generator 11 of unit 2 is supplying its full load current to the load circuit, relay 331 will be operated to close its H contact, thereby completing a circuit from ground, through contact of relay 224, key 411 and winding of relay 412 to negative battery, operating relay 412. As explained above, relay 543 will therefore be operated to decrease the resistance of potentiometer 540 in the field circuit of generator 12 to increase the generator output and cause the generator to be connected to the load circuit through a contact of contactor 520. Relay 412 will remain operated, causing the output of generator 12 of unit 3 to increase, until the output current of generator 12 reaches such a value that generator 11 of unit 2 supplies less than 75 per cent of its load ampere rating to the load circuit. At that time ammeter relay 331 will open its H contact, to disconnect ground from the circuit for energizing relay 412, thereby releasing relay 412 and causing the motor 541 to stop.

Each time that the load current supplied by generator 11 of unit 2 increases to 75 per cent of its full load rating, the circuit for energizing relay 412 is completed through the H contact of relay 331 to cause the output current from generator 12 of unit 3 to increase. If the output current of generator 11 should decrease to 25 per cent of its full load ampere rating, the L contact of ammeter relay 331 will close to complete the energizing circuit for relay 419, thereby causing the output of generator 12 to decrease.

If the current supplied from generator 12 of unit 3 should increase to its full load ampere rating, a circuit will be completed from ground, through the H contact of ammeter relay 530 and winding of relay 616, operating relay 616. The energizing circuit for relay 543 is thus opened at a contact of relay 616 to prevent an increase of output current of generator 12 and the motor starting circuit for the next unit, like unit 3, is energized to cause the generator of that unit to supply current to the load in the same way that the motor starter 518 of unit 3 is energized, as explained above, relays corresponding to relays 612 and 613 being provided.

If unit 4 is the unit following unit 3, when generator 12 of unit 3 reaches full load output to cause contact H of relay 530 to close, a circuit is completed for energizing relay 616. With relay 616 operated, a circuit is completed from negative battery through contacts of relays 616, 620 and 218 and winding of relay 618 to ground, causing relay 618 to operate. This relay 618 locks up through contacts of relays 621 and 620. The starting circuit of unit 4 is thus energized and a circuit is completed for energizing relay 617. When the output of circuit 4 reaches its full load rating, an energizing circuit for relay 619 is completed for controlling the starting of a succeeding unit if one is provided.

If the unit 3 is the last connected unit for supplying current to the load circuit, for example, as the load decreases, the output of generator 11 of unit 2 will decrease and, when the output of unit 2 reaches 25 per cent of its full load rating, the output of generator 12 of unit 3 will be caused to decrease, as previously described. When the output voltage of unit 3 has decreased to such an extent that reverse current of sufficient amplitude flows from battery 15 through resistor 519 and the armature of generator 12, ammeter relay 530 closes its L contact to complete a circuit from ground, through the winding of relay 614 and through a contact of relay 613 to negative battery, thereby operating relay 614. As a result the energizing circuit for relay 613 is opened to cause the deenergization of the starting circuit 518 and the stopping of motor 516. Generator 12 is thus disconnected from the load, as previously described. Similarly, the unit 2 will be shut down and disconnected from the load circuit when the L contact of ammeter relay 330 is closed.

The winding of a relay 398 in series with a rheostat 399 is connected across the resistor 319. When unit 2 is supplying current to the load circuit and the load decreases to a value which can be supplied from unit 1, this unit having smaller capacity than that of unit 2, the relay 398 releases to complete a circuit from ground, through a contact of relay 214, winding of a relay 225, contacts of relays 618, 613, 414 and 413 to negative battery, operating relay 225. Operated relay 225 closes a circuit from ground through its contact, through the armature of a motor 226 and through the secondary winding of transformer 410, thereby causing the motor to drive a cam switch 227 of a timing apparatus. The closing of the contact of cam switch 227 completes a circuit for energizing relay 222. Operation of relay 222 opens the previously described energizing circuits for relays 213 and 216, causing these relays to release. Release of relay 213 causes the completion of a circuit from negative battery through contacts of relays 212, 213 and 214, key 27 and lead 28 to the motor start circuit 18, through lead 29 and key 32 to ground, causing the unit 1 to restart. When contactor 20 operates to connect generator 10 to the load circuit, relay 223 releases to complete a circuit from negative battery, through contacts of relays 223, 215, 213, 222 and 416 and through winding of relay 220 to ground, operating relay 220. As a result, the energizing circuit for a relay of voltage regulator 335 which corresponds to relay 38 of regulator 35 is opened to remove the source of field current for generator 11 of unit 2. The output voltage of generator 11 thus decreases to cause ammeter relay 330 to close its L contact. A circuit is thus completed from ground through contacts of relays 611 and similar relays of additional units, not shown, contact of relay 617, winding of relay 415 and contact of relay 414 to negative battery. The resulting operation of relay 415 releases relay 414 to cause the starting circuit 318 to be deenergized and unit 2 is thus stopped and disconnected from the load circuit. The release of relay 414 also opens the energizing circuit for relay 225, thereby opening the energizing circuit for motor 226 of timer 227 to restore it to normal.

When all of the available units except unit 1 are operating to supply current to the load circuit but for some reason there is insufficient charging capacity due to one or more units being out of service for maintenance purposes or due to recharge after a power failure, for example, unit 1 is restarted when the current supplied by the last unit, shown as unit 4, builds up to its full load ampere rating and unit 2 is supplying at least 75 per cent of its full load ampere rating.

Under these conditions, the ammeter relay associated with unit 4 closes its H contact to complete an energizing circuit for relay 619. As a result, relays 412 and 218, being operated, there is completed a circuit from negative battery, through contacts of relays 218 and 221, winding of relay 221 and contacts of relays 226 and 222 to ground, operating relay 221. The operation of relay 221 causes the completion of a circuit from negative battery, through contacts of relays 212, 221 and 214, key 27 and starter 18 of unit 1 to ground, causing unit 1 to start and supply current to the load, as previously described. However, when the unit 1 restarts under this load condition, a circuit is completed from battery, through contacts of relays 416, 417, 413, 222, 221 and 215, winding of relay 124 and key 27 to ground, thereby operating relay 124. Relay 34 being operated, the operation of relay 124 removes the short circuit across rheostat 64 to raise the output of generator 10 of unit 1 to approximately full output constant current.

When, subsequent to the restarting of unit 1 as above described, the output of unit 2 decreases to 25 per cent of its full load rating, relay 224 being operated, a circuit is completed from ground through contacts of relays 331 and 224, key 411 and winding of relay 419 to negative battery. The resulting operation of relay 419 completes a circuit for operating relay 229. Operation of relay 229 completes a circuit from ground through its contact and winding of relay 228, through contacts of relays 221, 413, 417 and 416 to negative battery. The resulting operation of relay 228 opens an energizing circuit to release relay 221. Release of relay 221 opens the circuit for energizing the starting circuit 18 through contacts of relays 212, 221 and 214, thereby stopping the generator 10 of unit 1 and disconnecting it from the load circuit.

What is claimed is:

1. In combination, a first and a second current supply source adapted for supplying current to a variable load, means for causing said first current supply source to supply current to said load, means responsive to an increase of current supplied by said first source to said load to a first predetermined value for causing said second current supply source to supply current to said load to supplement the current supplied from said first source, thereby causing the current supplied by said first source to be reduced to a second value below said first predetermined value, and means responsive to an increase of current supplied by said first source to a third predetermined value larger than said second value and less than said first predetermined value for causing an increase of current supplied by said second source to said load.

2. In combination, a first and a second current supply source adapted to supply current to a variable load, means for causing said first current supply source to supply current to said load, means responsive to an increase of current supplied from said first source to said load to a first predetermined amplitude for causing said second current supply source to supply current to said load to supplement the current supplied from said first source to said load, means for causing the amplitude of the current supplied from said second source to increase gradually when the amplitude of the current supplied from said first source is larger than a second predetermined amplitude smaller than said first predetermined amplitude, and means for causing the amplitude of the current supplied from said second source to decrease gradually when the amplitude of the current supplied from said first source is less than a third predetermined amplitude smaller than said second predetermined amplitude.

3. In combination, a first and a second current supply unit adapted for supplying current to a variable load, means for energizing said first unit to cause it to supply current to said load, means for varying the output current of said first unit under control of the load voltage to minimize load voltage changes, means for energizing said second unit to cause it to supply current to said load in response to a certain maximum current supplied from said first unit to said load, means responsive to current within a first amplitude range including said maximum current supplied from said first unit to said load for causing the current supplied from said second unit to said load to increase gradually, and means responsive to current within a second range of amplitudes smaller than the amplitudes of said first range supplied from said first unit to said load for causing the current supplied from said second unit to said load to decrease gradually.

4. A combination in accordance with claim 3 in which said first and second ranges of current amplitudes are separated by a third range which is larger than each of said first and second ranges.

5. In combination, a first and a second current supply unit, a first and a second current path, means for energizing said first unit to cause it to supply current through said first current path to a load circuit, relay means for said first unit responsive to the current flowing through said first current path, means comprising said relay means for energizing said second unit to cause it to supply current through said second current path to said load circuit when the current in said first current path reaches a certain maximum value, means comprising said relay means for increasing the current supplied by said second unit in response to current in said first current path having an amplitude greater than a first predetermined value which is less than said maximum value, and means comprising said relay means for decreasing the current supplied by said second unit in reponse to current in said first current path having an amplitude less than a second predetermined value which is less than said first predetermined value.

6. A combination in accordance with claim 5 in which there are provided a third current supply unit, a second relay means for said second supply unit and means comprising said second relay means for energizing said third supply unit to cause it to supply current to said load when the current in said second current path reaches a certain maximum value.

7. A combination in accordance with claim 6 in which there are provided a third relay means for said third current supply source and means comprising said third relay means for interrupting the energization of said third supply unit when the current in said second current path has a value less than a predetermined minimum value.

8. In combination, a first and a second current supply unit, a first and a second current path, means for energizing said first unit to cause it to supply current through said first current path to a load circuit, means for varying the current supplied by said first supply unit through said first current path, means for energizing said second supply unit to cause it to supply current in a predetermined direction through said second current path to said load circuit when the current supplied through said first current path reaches a predetermined maximum value, means for varying the current supplied through said second current path to said load and means responsive to a flow of current through said second current path in a reverse direction with respect to said predetermined direction for interrupting the energization of said second current supply unit.

9. In combination, a first, a second and a third current supply unit for supplying current to a load including a battery when energized, means for energizing said first unit to cause it to supply current to said load, means responsive to the supply of current of a predetermined amplitude from said first unit to said load for energizing said second unit to cause it to supply current to said load, means responsive to the amplitude of the current supplied from said first unit to said load for controlling the amplitude of the current supplied from said second unit to said load, means responsive to the supply of current of a certain maximum amplitude from said second unit to said load for maintaining the supply of said maximum amplitude current from said second unit to said load and for energizing said third supply unit to cause it to supply current to said load, means responsive to the amplitude of the current supplied from said first unit to said load for controlling the output voltage of said third unit to control the amplitude of the current supplied from said third unit to said load, and means responsive to a reverse current supplied from said battery to said third supply unit for deenergizing said third supply unit.

10. In combination, a first, a second and a third current supply source adapted for supplying current to a variable load, said second source having a larger rated current capacity than that of said first source, means for causing said first source to supply current to said load, means responsive to an increase of current supplied from said first source to the load to a predetermined amplitude for causing said second source to supply current to said load and for causing the interruption of the supply of current from said first source to said load, means responsive to an increase of current supplied from said second source to said load to a predetermined amplitude for causing said third source to supply current to said load, and means responsive jointly to an increase of current supplied by said third source to a predetermined value and to an increase of current supplied by said second source to said predetermined amplitude for causing current to be supplied from said first source to said load to supplement the supply of current from said second and third sources to said load.

HARVEY T. LANGABEER.

References Cited in the file of this patent
UNITED STATES PATENTS

| Number | Name | Date |
|---|---|---|
| 2,339,490 | Langabeer | Jan. 18, 1944 |
| 2,572,210 | Spencer | Oct. 23, 1951 |